United States Patent [19]

Barzantny et al.

[11] 4,449,890
[45] May 22, 1984

[54] DEVICE FOR CONTROLLING A LIQUID METAL FLOW IN A TUBE

[75] Inventors: Joachim Barzantny, Kürten-Eichof; Joachim Beske, Bergisch Gladbach; Rainer Hans, Bergisch Gladbach; Theodor Lauhoff, Bergisch Gladbach, all of Fed. Rep. of Germany

[73] Assignee: Siemens Interatom, Intl. Atomreaktorbau GmbH, Bergisch-Gladbach, Fed. Rep. of Germany

[21] Appl. No.: 158,240

[22] Filed: Jun. 10, 1980

[30] Foreign Application Priority Data

Jun. 15, 1979 [DE] Fed. Rep. of Germany ....... 2924116

[51] Int. Cl.³ .............................................. H02N 4/20
[52] U.S. Cl. .................................................... 417/50
[58] Field of Search .............................. 417/50; 310/11

[56] References Cited

U.S. PATENT DOCUMENTS

| | | | |
|---|---|---|---|
| 2,397,785 | 4/1946 | Friedlander | 417/50 |
| 2,702,004 | 2/1955 | Blake et al. | 417/50 |
| 2,920,571 | 1/1960 | Fenemore et al. | 417/50 |
| 2,931,963 | 4/1960 | Wilson | 318/22 |

FOREIGN PATENT DOCUMENTS

| | | |
|---|---|---|
| 1553138 | 2/1970 | Fed. Rep. of Germany . |
| 42-6023 | 6/1967 | Japan .................................. 417/50 |

*Primary Examiner*—Edward K. Look
*Attorney, Agent, or Firm*—Herbert L. Lerner; Laurence A. Greenberg

[57] ABSTRACT

Device for controlling a liquid metal flow in a tube having a prismatic cross section including a plurality of comb-like slotted magnet cores grouped about the periphery of the tube and extending parallel to the flow direction of the liquid metal, electromagnetic coils respectively connected to one of the phases of a polyphase alternating current and mounted respectively on teeth of the plurality of comb-like magnet cores, n.x of the coils of which n equals an optional whole number and x equals the number of a-c phases being mounted on each of the magnet cores, the magnet cores being disposed in planes extending at an angle other than 90° to the surface of the tube.

6 Claims, 9 Drawing Figures

DEVICE FOR CONTROLLING A LIQUID METAL FLOW IN A TUBE

The invention relates to a device for controlling a liquid metal flow in a tube having a prismatic cross section by means of electromagnetic coils respectively connected to one of the phases of a polyphase alternating current and mounted on the teeth of a plurality of comb-like slotted magnet cores grouped about the periphery of the tube and extending parallel to the flow direction. The expression "controlling" as employed herein is meant to include the use of the device according to the invention both as a magnetohydrodynamic pump as well as a metering device for controlling discharge of a liquid metal from a vessel. In the first-mentioned use, the highest possible throughput is striven for, to which end the device, pumps or delivers, aided by gravity if such be the case. In the second-mentioned type of use it may be desired to retard the liquid metal flow or bring it to a complete stop, to which end, for example, an output can be produced which neutralizes the effect of gravity.

In German Published Prosecuted application (DE-AS) No. 10 28 297, a device for controlling the flow velocity of liquid metal is described wherein electromagnetic coils supplied by a polyphase controllable current source are wound around the tube in such a manner that the axes thereof are disposed parallel to the flow direction in the tube. These coils can therefore be assembled only if the tube is interrupted at one end thereof. This is undesired, however, for devices which conduct hot liquid metal and is subject to considerable loss of time for repairs or inspections.

In German Published Non-Prosecuted application (DE-OS) No. 22 40 120, an electromagnetic pump is described wherein, likewise, the axes of the coils are disposed parallel to the flow direction in the tube. So that these coils can be assembled without interruption of the tube, there are disposed within the region of the coils an outer tube closed at one end and an inner tube open at both ends thereof, the liquid metal in the annular space between both of those tubes flowing outwardly and flowing back in the inner tube. Inflow and outflow are located only at one end of the device so that the coils can be slipped onto the pipeline or tubing. A disadvantage of such a construction is the marked hydraulic pressure loss in the annular channel and the additional pressure loss for variations of about 90° in the flow direction in the inflow and of 180° at the closed end of the outer tube.

In German Published Prosecuted application (DE-AS) No. 11 20 079 there has been described a device for controlling the velocity or rate of fall of a flow of molten metal wherein a respective vertically disposed, multi-toothed magnet core is provided on both longitudinal sides of a likewise vertical tube of rectangular cross section, the magnet core having eighteen electromagnetic coils disposed above one another thereon. The coils are wound on the individual teeth of the magnet core and have axes which are perpendicular to the tube axis. Between the coils and the tube, a free space remains through which a draft or air current can be conducted with which the parts of the magnet core adjacent the tube, and the insulation of the coils are cooled. What is sought to be prevented thereby, when using the device for metals with a high melting point, is the occurrence of any heating of the metal sheets or plates of the magnet core above the Curie Point, although the teeth of the magnet core extend very closely to the tube. The so-called Curie Point indicates that temperature at which an otherwise magnetic material loses the magnetic characteristics thereof. The teeth of the magnet core are enlarged or thickened at the ends thereof facing toward the tube; the magnetic field is thereby supposed to be distributed uniformly along the channel and heating of the coils due to thermal radiation emanating from the tube is supposed to be reduced thereby. These teeth have the disadvantage, however, that the coils must be wound painstakingly in situ on the individual teeth. The large number of small coils result in an overall length due to which the device becomes heavy and due to which relatively high hydraulic losses arise in the tube.

It is accordingly an object of the invention to provide a device of the hereinaforedescribed type which can be assembled relatively easily and without having to interrupt the tube for the liquid metal, and which has a reduced overall height.

It is another object of the invention to provide such a device having a relatively lower hydraulic pressure loss than heretofore known devices of this general type, because a great part of the power supplied to a magnetohydrodynamic pump is lost therewithin.

With the foregoing and other objects in view, there is provided, in accordance with the invention a device for controlling a liquid metal flow in a tube having a prismatic cross section comprising a plurality of comb-like slotted magnet cores grouped about the periphery of the tube and extending parallel to the flow direction of the liquid metal, electromagnetic coils respectively connected to one of the phases of a polyphase alternating current and mounted respectively on teeth of the plurality of comb-like magnet cores, n.x of the coils of which n equals an optional whole number and x equals the number of a-c phases being mounted on each of the magnet cores, the magnet cores being disposed in planes extending at an angle other than 90° to the surface of the tube.

If the number of coils is selected as an integer multiple of the number of alternating-current phases, this results in a simplification of the circuit arrangement and, in connection with variations thereof, as discussed hereinbelow in especially advantageous types of operation of the device. On the other hand, limitation to three and, circumstances permitting, six coils per magnet core (in the most often provided use of a three-phase alternating current) permits a very slight extension of the device in longitudinal direction of the tube. This is, for example, also important if an already-existing casting or molding plant with only limited space between the vessel outflow or outlet and the mold or die is to be subsequently equipped with the device according to the invention. The inclined or oblique disposition of the magnet core with respect to the tube, as is more clearly explained hereinbelow in the description of the various embodiments of the inventive device, permits the accommodation of a greater coil volume and, accordingly, a greater output of the device, with respect to the tube length which is used. The size, and especially the width, of the magnet-core teeth can be held within a technically realizable range even for relatively large plants. The flow velocity in the tube, moreover, becomes uniform.

In accordance with another feature of the invention, the teeth of adjacent magnet cores are mutually staggered in vertical direction and are in meshing relationship. The meshing of the teeth of the various magnet cores affords yet an improved utilization of the length which is available in that the interruptions due to the slots or grooves in the magnet cores are filled up by the teeth of the other magnet cores. The teeth of the magnet cores can indeed be so constructed that, with the magnet core disassembled, the finished coils can easily be slipped onto the magnet core.

In accordance with a further feature of the invention, the teeth of the magnet cores have a shape matching the contour of the tube. This calls for the magnet cores not to be constructed of identical individual metal sheets or plates, but nevertheless permits a reduction in the air gap between the magnet core and the tube wall.

In accordance with an added feature of the invention, the magnet cores are formed of a material having a high saturation induction and a high Curie point. This feature renders the device of the invention especially suitable for use with metals having a high melting point.

The relatively good magnetic properties, for example, of pure magnetic iron having a Curie point of about 770° C. or an iron-cobalt alloy having a Curie point of about 950° C. are basically known. The price of such materials is very high, however, for example for an alloy formed of about half iron and half cobalt, the price is about eight times greater than for normal transformer sheets or plates. Furthermore, the machining or processing of this material is considerably more difficult so that the man of skill in the art has heretofore had no reason for using this material. It has been found, surprisingly, that by means of this material in accordance with the invention, in combination with a compact arrangement of the coil magnet cores, in fact for liquid metals of high temperature, the output of a pump or control device can be increased considerably. In this regard, not only is the output increased with respect to the overall volume or overall height, but also, due to the possible reduction in the overall height, the inner hydraulic resistance is considerably reduced.

These advantages are not attainable with the proposed material alone or with the heretofore known device alone. Since such materials withstand considerably higher temperatures, additional advantages ensue for specific applications thereof. In nuclear energy installations, which are operated with liquid sodium of about 600° C., cooling of the magnet cores may be dispensed with; the safety of the installation is increased by the elimination of a possibly trouble-prone cooling system. If no passageways are required for a cooling fluid, the device can be constructed more compactly; consequently, the output is increased, in turn.

In accordance with alternative features of the invention, the coils are connected in a form wherein traveling waves produced therein add in one direction, add to a greater extent in one direction and to a lesser extent in opposite direction, or one half of the traveling waves produced therein add, respectively, in one direction and the other half thereof in the opposite direction.

These alternative circuit embodiments are of special importance in the application of the device as a control device. In the circuit embodiment wherein the waves add in one direction, namely a star or wye connection, the delivery of the pump is able to be maximized. Heating of the delivered fluid due to the unavoidably occurring eddy currents is minimized, on the other hand. This circuit is especially suited for continuous operation at high throughput or flow rate. The circuit embodiment wherein traveling waves add to a greater extent in one direction and to a lesser extent in opposite direction is especially suited for operation at reduced throughput. A greater part of the applied energy is transformed into heat and serves for maintaining the liquid metal at a desired temperature, and especially to prevent freezing thereof.

The circuit embodiment wherein half of the traveling wave adds in one direction and the other half in the other direction, which is likewise a star or wye connection, finds application, especially if the metal which has solidified in the tube after a pause in operation is to be reliquefied; delivery of the liquid metal does not then take place, but rather the entire applied energy is used for heating up the metal.

Other features which are considered as characteristic for the invention are set forth in the appended claims.

Although the invention is illustrated and described herein as embodied in a device for controlling a liquid metal flow in a tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
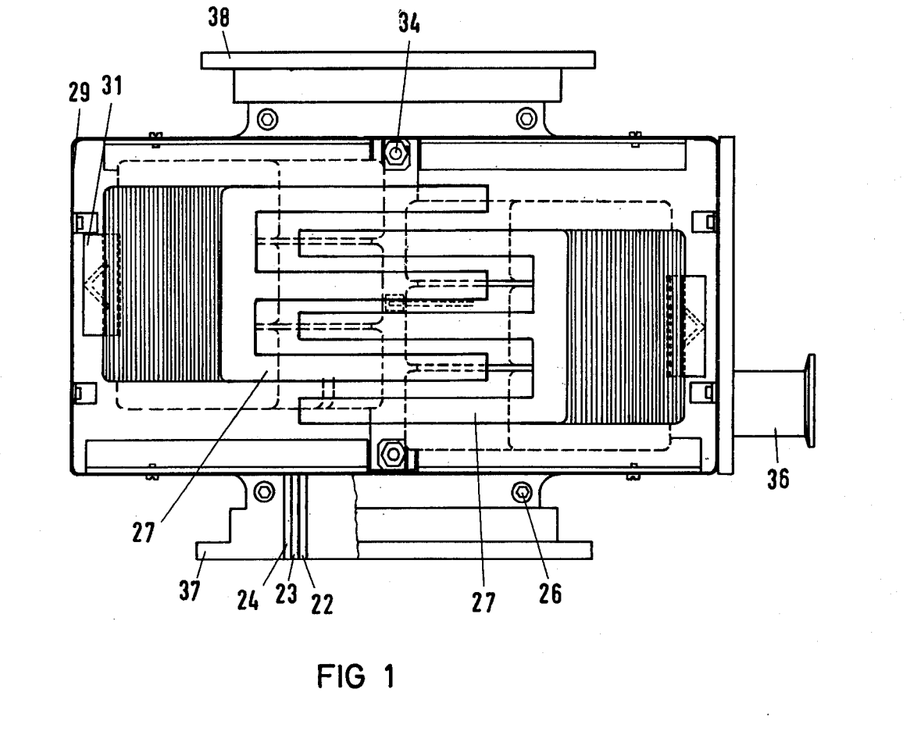
FIGS. 1 and 2 are side elevational and top plan views, respectively, of a first embodiment of a device of the smallest possible structural height for controlling a liquid metal flow in a tube in accordance with the invention, a lateral sheetmetal sheathing and an upper connecting piece being omitted, respectively, from FIGS. 1 and 2.
Figure 2:
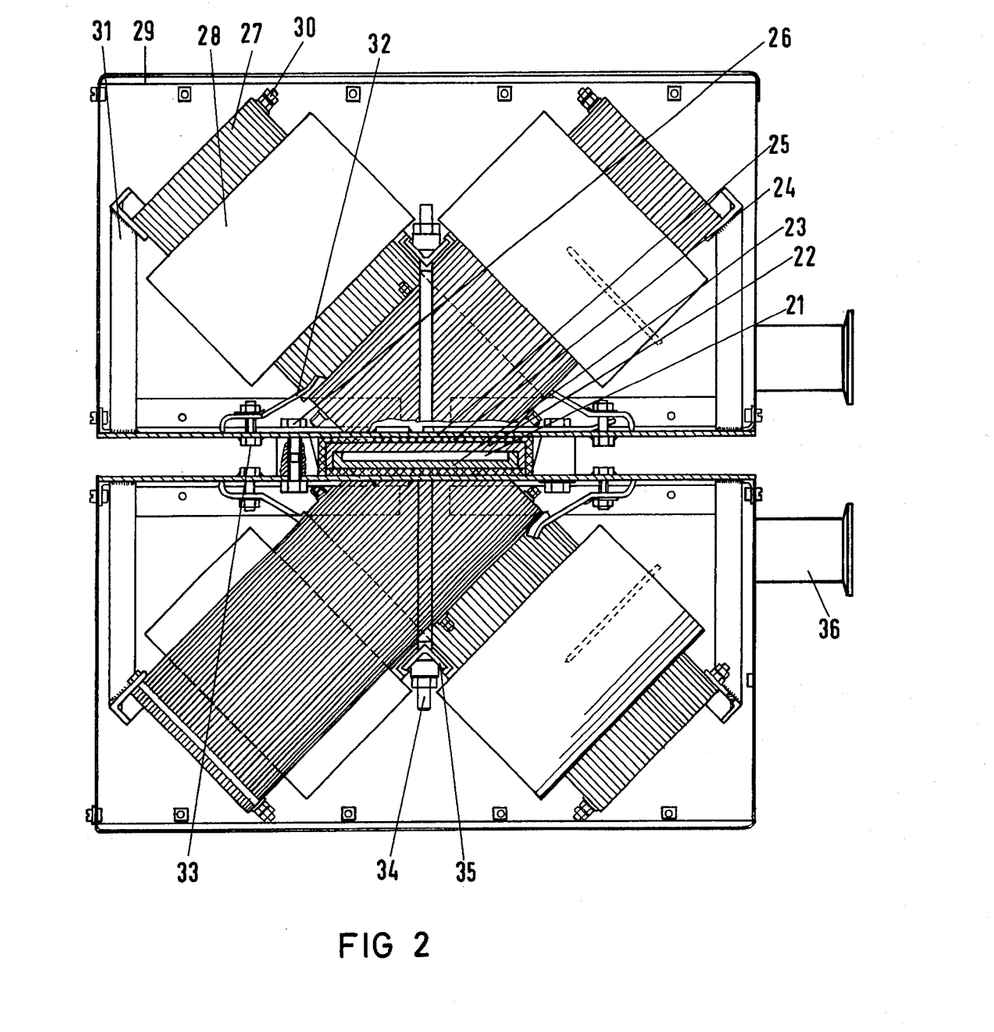

Referring now to the drawing and first, particularly, to FIGS. 1 and 2 thereof, there is shown a tube 21 of rectangular cross section in which liquid metal is conducted, the tube 21 being formed of two U-shaped ceramic elements 22 and 23 telescoping or emboxed within each other and enclosed by a sheetmetal box 24. The latter, in turn, is held together by two metal sheets 25, that is by means of several bolts 26. Two E-shaped magnet cores 27 are fastened to each of the metal sheets or plates 25 and, on each of the latter, three electromagnetic coils 28. These are accomodated in a sheetmetal housing 29. The device of the invention can be assembled and disassembled in two halves without having to open the tube 21 in addition. The magnet cores 27 are formed, in a conventional manner, of a large number of thin metal sheets which are held together by bolts 30 and fastened to holders 31. Besides being held with these welded-together holders 31 formed of angle irons, the magnet cores 27 are also held by bent metal sheets 32 which are fastened with bolts 33 to the metal plates 25, as well as by angle irons 35 which are held together by a threaded rod 34. Through connecting pieces or unions 36, cooling gas can be supplied when required, the cooling gas being discharged again through non-illustrated slots formed in the sheetmetal casing 29. It is apparent from FIG. 1 that the magnet cores 27 of one side are mutually staggered in vertical direction so that the teeth thereof can mesh. It is especially clear in FIG. 2 that, for a given length of the tube 21, a greater coil volume and, accordingly, a higher power can be brought into operation. Flanges 38 serve for joining the device according to the invention to non-illustrated vessels or extending pipelines.

Figure 3:
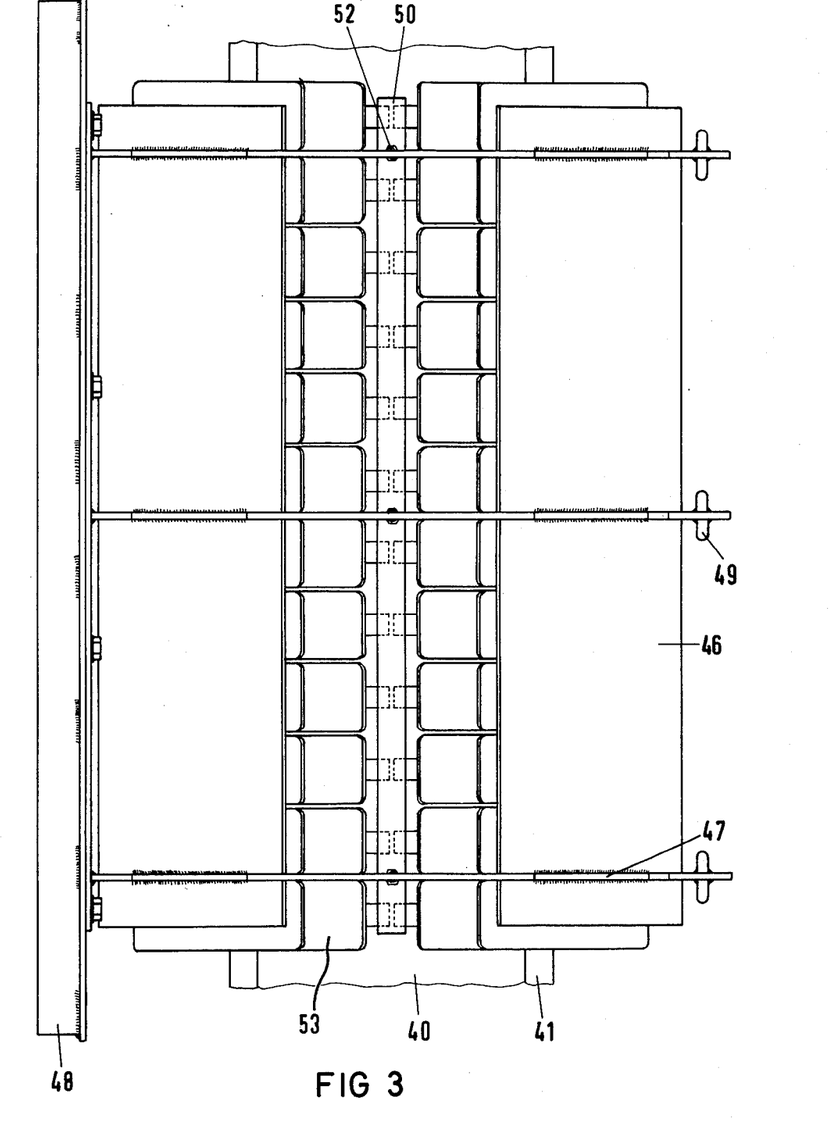
FIGS. 3 and 4 are side elevational and top plan views, respectively, of a second embodiment of the invention employed as a pump.
Figure 4:
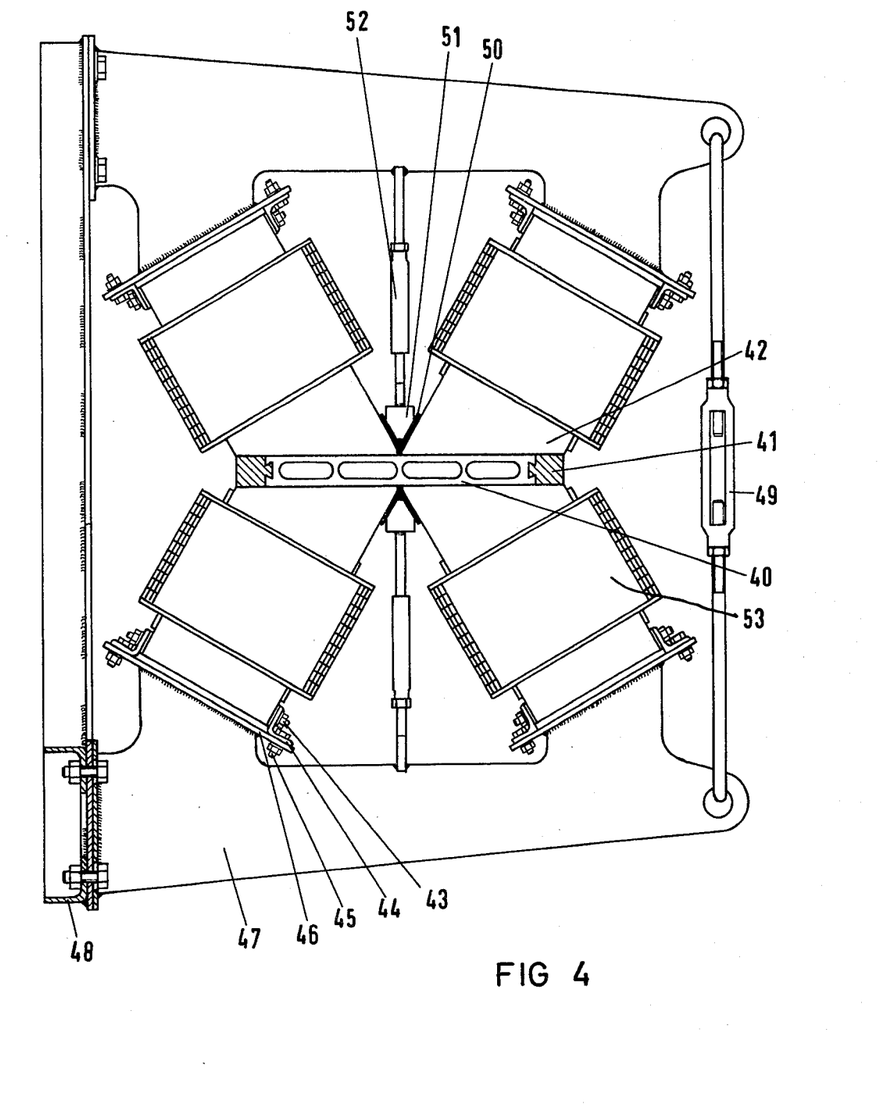

In the second embodiment (FIGS. 3 and 4), a multiple hollow section 40 serves as the tube. This is connected, at the narrow side thereof, to copper sections 41 by means of dove-tailed grooves or notches. The copper sections 41 serve as return leads for the induction currents flowing transversely to the tube axis whereby pump power and efficiency are improved. Four magnet cores 42 whereon twelve coils, respectively, are wound, are disposed at an angle of about 60° to the surface of the tube 41. The individual metal sheets of the magnet cores 42 are held together by bolts 43 to which angles 44 are fastened, which, in turn, are threadedly secured with further bolts 45 to supporting metal sheets 4, 6 which, as apparent from FIG. 4, are held by three frame metal-sheets 47, respectively, disposed on each side of the device according to the invention. The three frame metal-sheets 47, respectively, are fastened on the one side to a frame 48 of U-sections and are held together at the other end by turnbuckles 49. This device according to the invention can likewise be assembled and disassembled easily in two halves without having also to open the tube 45. The magnet cores 42 are further held by angle sections 50 against which wedges 51 are pressed, the latter being braced by further turnbuckles 52 against the frame metal-sheets 57. In this embodiment of FIG. 3, the respective teeth of the individual magnet cores 42 are disposed at the same height and do not mesh one with the other.

Figure 5:
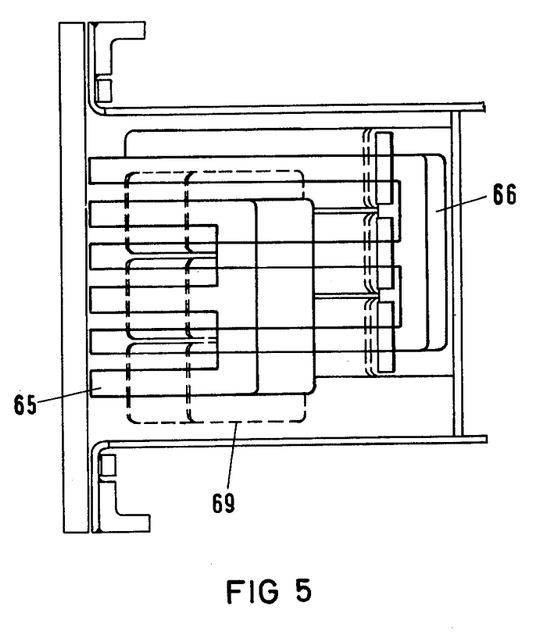
FIGS. 5 and 6 are side elevational and top plan views, respectively, of a third embodiment of the invention wherein the features of the first and second embodiments are mutually combined.
Figure 6:
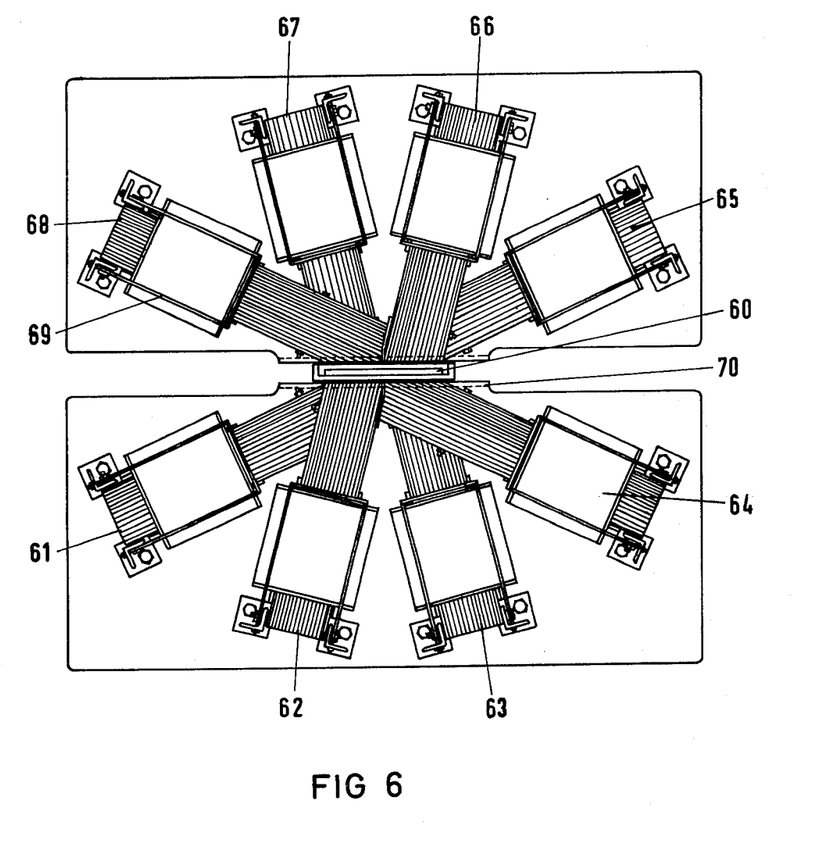

In the third embodiment of the invention (FIGS. 5 and 6), a tube 60 similar in construction to that of the hereinaforementioned tube 21 shown in FIG. 2, for example, is entirely surrounded by eight magnet cores 61 to 68 onto each of which, respectively, three coils 69 have been slipped. Respective adjacent magnet cores, namely the magnet-core pairs 61 and 62; 63 and 64; 65 and 66 as well as 67 and 68 are disposed at respectively varying elevations and the teeth thereof mesh. The sets of magnet cores 61 and 63; 62 and 64, 65 and 67 as 66 and 68 are mutually disposed at, respectively, the same elevation, and are suitably formed at the location in vicinity of the tube 60 whereat they meet. The magnet cores are fastened, for example, to the upper and lower sheetmetal holders 70 in a manner similar to the further hereinaforedescribed embodiments of the invention.

Figure 7:
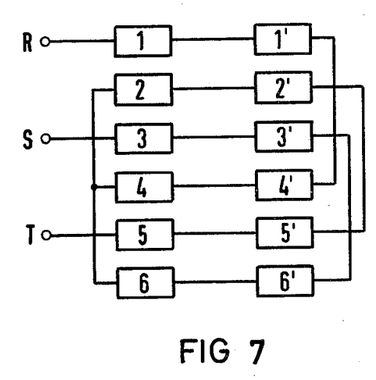
FIGS. 7, 8 and 9 are diagrams of three different circuit arrangements suitable for operating the device according to the invention.

FIG. 7 is a first circuit diagram of the coils which are identified therein by reference characters 1 to 6 and 1' to 6' for adjacent magnet cores. The coils 1 and 1' are connected in series with the coils 4' and 4, and so forth. At the output of the coils 4, 5 and 6, the three current phases R, S and T of the alternating current which is employed, are connected into a star or neutral point. This star or wye connection has the best efficiency with respect to output or delivery.

Figure 8:
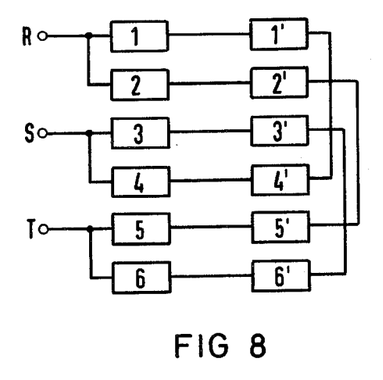

FIG. 8 shows the same coils as in FIG. 7, but connected, however, in a delta circuit or connection. As in FIG. 7, the coils 1 and 1' are connected in series with the coils 4' and 4, and so forth. At the output of the coils 2, 4 and 6, the three phases R, S and T are connected, however, with the phases S, T and R into a so-called delta. With respect to output or delivery, the circuit of FIG. 8 has a lower efficiency, and consequently a higher heat output which may be of interest when operating the device with a low throughput or flow rate in order to equalize the heat losses to the surroundings and thus protect the liquid metal in the tube or pipe from solidifying.

Figure 9:
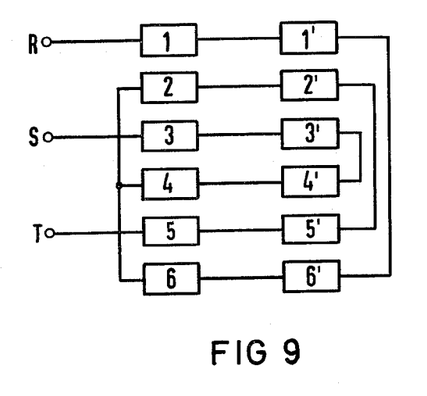

FIG. 9 shows a star or wye connection or circuit wherein the traveling waves which are produced are mutually cancelled. The delivery or output is therefore nil and the entire supplied energy is converted to heat which can serve, for example, for liquefying the metal which has solidified in the tube.

There are claimed:

1. Device for controlling a liquid metal flow in a tube having a substantially rectangular cross section with two relatively elongated and two relatively short sides comprising a plurality of comb-like slotted magnet cores grouped at the two relatively elongated sides of the tube and extending parallel to the flow direction of the liquid metal, electromagnetic coils for generating magnetic traveling waves respectively connected to one of the phases of a polyphase alternating current and mounted respectively on teeth of said plurality of comb-like magnet cores, said teeth extending in a direction orthogonal to the direction of flow through the tube and having a shape matching the contour of the tube, n.x of said coils of which n equals an optional whole number and X equals the number of a-c phases being mounted on each of said magnet cores, said electromagnetic coils being distributed on at least four said comb-like magnet cores, respectively, disposed in planes extending at an angle other than 90° to said relatively elongated sides of the tube, said planes wherein said magnet cores are disposed being mutually symmetrical with respect to central planes of the tube.

2. Device according to claim 1 wherein the teeth of adjacent magnet cores are mutually staggered in vertical direction and are in meshing relationship.

3. Device according to claim 1 wherein said magnet cores are formed of a material having a high saturation induction and a high Curie point.

4. Device according to claim 1 wherein said coils are connected in a form wherein traveling waves produced therein add in one direction.

5. Device according to claim 1 wherein said coils are connected in a form wherein traveling waves produced therein add to a greater extent in one direction and to a lesser extent in opposite direction.

6. Device according to claim 1 wherein said coils are connected in a form wherein one half of traveling waves produced therein add, respectively, in one direction and the other half thereof in the opposite direction.

* * * * *